United States Patent
Klatt (10) Patent No.: US 10,938,452 B2
(45) Date of Patent: Mar. 2, 2021

(54) BASE STATION SYSTEM FOR TRANSMITTING A DATA STREAM TOWARDS A USER ENTITY

(71) Applicant: Deutsche Telekom AG, Bonn (DE)

(72) Inventor: Axel Klatt, Cologne (DE)

(73) Assignee: DEUTSCHE TELEKOM AG, Bonn (DE)

(*) Notice: Subject to any disclaimer, the term of this patent is extended or adjusted under 35 U.S.C. 154(b) by 0 days.

(21) Appl. No.: 16/770,085

(22) PCT Filed: Nov. 14, 2018

(86) PCT No.: PCT/EP2018/081162
§ 371 (c)(1),
(2) Date: Jun. 5, 2020

(87) PCT Pub. No.: WO2019/120765
PCT Pub. Date: Jun. 27, 2019

(65) Prior Publication Data
US 2020/0313728 A1    Oct. 1, 2020

(30) Foreign Application Priority Data

Dec. 22, 2017 (EP) .................................... 17210296

(51) Int. Cl.
*H04B 7/0408* (2017.01)
*H04B 7/0413* (2017.01)
*H04B 7/06* (2006.01)

(52) U.S. Cl.
CPC ......... *H04B 7/0408* (2013.01); *H04B 7/0413* (2013.01); *H04B 7/0617* (2013.01); *H04B 7/0632* (2013.01)

(58) Field of Classification Search
None
See application file for complete search history.

(56) References Cited

U.S. PATENT DOCUMENTS 9,445,389 B1 * 9/2016 Kullman .............. H04B 7/0617
2008/0045212 A1   2/2008 Kim et al.
(Continued)

FOREIGN PATENT DOCUMENTS

WO    WO 2011134493 A1    11/2011

OTHER PUBLICATIONS

Budhiraja, et al.: "Transceiver Design for Nonconcurrent Two-Way MIMO AF Relaying with QoS Guarantees," IEEE Transactions on Vehicular Technology 65, 12: 9651-9661 (Dec. 1, 2016). XP011636748.

*Primary Examiner* — Rebecca E Song
(74) *Attorney, Agent, or Firm* — Leydig, Voit & Mayer, Ltd.

(57) ABSTRACT

A base station system transmits a data stream towards a user entity. The data stream has first data and second data, the first data being associated with a first transmission quality requirement, and the second data being associated with a second transmission quality requirement. The base station system comprises: a multiple-in-multiple-out (MIMO) base station that is configured to handle communications of the user entity in a communication cell using beamforming; at least one remote transmitter, which is arranged spaced apart from the MIMO base station in the communication cell; and a further remote transmitter which is arranged spaced apart from the MIMO base station and from the remote transmitter in the communication cell, the further remote transmitter being configured to support communications towards the user entity in the communication cell.

9 Claims, 3 Drawing Sheets

(56) References Cited

U.S. PATENT DOCUMENTS

| | | | |
|---|---|---|---|
| 2009/0185492 A1* | 7/2009 | Senarath | H04L 45/122 370/238 |
| 2011/0249613 A1* | 10/2011 | Sun | H04B 7/0617 370/315 |
| 2012/0106428 A1 | 5/2012 | Schlicht et al. | |
| 2015/0162959 A1* | 6/2015 | Jindal | H04B 7/0617 370/331 |
| 2016/0219578 A1 | 7/2016 | Lim et al. | |
| 2017/0359116 A1* | 12/2017 | Hwang | H04B 17/309 |
| 2018/0227282 A1* | 8/2018 | Lee | H04L 63/061 |

* cited by examiner

BASE STATION SYSTEM FOR TRANSMITTING A DATA STREAM TOWARDS A USER ENTITY

CROSS-REFERENCE TO PRIOR APPLICATIONS

This application is a U.S. National Phase application under 35 U.S.C. § 371 of International Application No. PCT/EP2018/081162, filed on Nov. 14, 2018, and claims benefit to European Patent Application No. EP 17210296.4, filed on Dec. 22, 2017. The International Application was published in English on Jun. 27, 2019 as WO 2019/120765 A1 under PCT Article 21(2).

FIELD

In general, the present invention relates to the field of wireless communications. More specifically, the present invention relates to a base station system, a user entity and a corresponding method for transmitting a data stream.

BACKGROUND

To make use of available communication resources more efficiently, space diversity (also known as antenna diversity) can be used and being enhanced to the use of directional beams. For this purpose, a base station can use differently-oriented beams for communication with different user entities in the space dimension. Multiple Input Multiple Output (MIMO) Systems combine the transmission via multiple antenna elements and can create the above mentioned beams in a more selective manner. Such systems having a higher number of transmitting and receiving antenna elements are also referred to as Massive Multiple Input Multiple Output Systems (mMIMO).

However, a structural problem in the case of mMIMO communication with beamforming is transmission of data with validity over a large space segment, especially to the user entity which is not yet connected to the mobile radio system. In order to transmit the data using beamforming, several beams or beam movement can be deployed. Thereby, available space-diversity resources must be deployed for transmitting the data in different directions, which contradicts the space-diversity notion per se.

Another problem is the shading in the urban environment, which can be caused for example by buildings, trees or other obstacles between the user entity and base station therein. This problem can only be partially compensated by electro-magnetic diffraction effects, in particular by increasing beam separation or resolution.

In light of the above, there is a need for an improved base station system, allowing transmitting a data stream towards a user entity.

SUMMARY

In an exemplary embodiment, the present invention provides a base station system for transmitting a data stream towards a user entity. The data stream has first data and second data, the first data being associated with a first transmission quality requirement, and the second data being associated with a second transmission quality requirement. The base station system comprises: a multiple-in-multiple-out (MIMO) base station that is configured to handle communications of the user entity in a communication cell using beamforming; at least one remote transmitter, which is arranged spaced apart from the MIMO base station in the communication cell; and a further remote transmitter which is arranged spaced apart from the MIMO base station and from the remote transmitter in the communication cell, the further remote transmitter being configured to support communications towards the user entity in the communication cell. The MIMO base station is configured to directly transmit the first data towards the user entity using a transmission beam and to forward the second data towards the remote transmitter. The remote transmitter is configured, upon receipt of the second data, to transmit the second data towards the user entity. The MIMO base station is configured to select the remote transmitter or the further remote transmitter to transmit the second data towards the user entity, and to forward the second data towards the selected remote transmitter. The MIMO base station is configured to select the remote transmitter based on a quality of communication link between the remote transmitter and the user entity supporting the second transmission quality requirement. The first transmission quality requirement is lower than the second transmission quality requirement. The MIMO base station is configured to transmit the first data to the remote transmitter based on: a communication link between the base station and the user entity not fulfilling the first transmission quality requirement and a communication link between the remote transmitter and the user entity fulfilling the first transmission quality requirement.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

In the various figures, identical reference signs will be used for identical or at least functionally equivalent features.

DETAILED DESCRIPTION

Exemplary embodiments of the disclosure to provide an improved base station system, allowing transmitting a data stream towards a user entity.

Generally, the disclosure relates to a multiple-in-multiple-out (MIMO) base station, a remote transmitter, and a user entity as well as a corresponding method for transmitting a data stream more efficiently and reliably towards a user entity in a communication network.

More specifically, embodiments of the present disclosure can utilize the massive MIMO resources primarily for data transmissions/communications that also need these resources, for instance, because of their high data rates. Also for less resource-demanding communications, embodiments of the present disclosure can utilize spatially-distributed transmitters to handle these communications, such as voice or data with low bit rates or data links with low requirements of quality of service (QoS).

Furthermore, embodiments of the present disclosure can first use beamforming for data transport to the transmitters and then use the transmitters for data transport, especially in shaded urban areas, such as street corners or urban canyons where streets are flanked by high buildings on both sides.

Thus, according to a first aspect the disclosure relates to a base station system for transmitting a data stream towards a user entity, wherein the data stream comprises first data and second data, the first data being associated with a first transmission quality requirement and the second data being associated with a second transmission quality requirement. The base station system comprises: a multiple-in-multiple-out (MIMO) base station that is configured to handle communications of the user entity in the communication cell using beamforming; and at least one remote transmitter, which is arranged spaced apart from the MIMO base station in the communication cell; wherein the MIMO base station is configured to directly transmit the first data towards the user entity using a transmission beam and to forward second data towards the remote transmitter; and wherein the remote transmitter is configured, upon receipt of the second data, to transmit the second data towards the user entity.

An improved base station system is hence provided, allowing transmitting a data stream towards a user entity in a more efficient and reliable manner.

In a further possible implementation form of the first aspect, the base station system comprises a further remote transmitter which is arranged spaced apart from the MIMO base station and from the remote transmitter in the communication cell, the further remote transmitter being configured to support communications towards the user entity in the communication cell.

Thereby, the data stream can be efficiently communicated across the entire communication cell with reduced transmission power per beamforming transmitter, as compared to the transmission power which would be required by the MIMO base station to transmit the data stream.

In a further possible implementation form of the first aspect, the MIMO base station is configured to select the remote transmitter or the further remote transmitter to transmit the second data towards the user entity, and to forward the second data towards the selected remote transmitter.

In a further possible implementation form of the first aspect, the MIMO base station is configured to select the remote transmitter if a quality of communication link between the remote transmitter and the user entity supports the second transmission quality requirement.

In a further possible implementation form of the first aspect, the MIMO base station is configured to transmit the second data to the remote transmitter and to the further remote transmitter, wherein the remote transmitter is configured, upon receipt of the second data, to transmit the second data towards the user entity.

In a further possible implementation form of the first aspect, the data stream comprises third data associated with a third transmission quality requirement, wherein the MIMO base station is configured to transmit the third data towards the further remote transmitter, and wherein the further remote transmitter is configured, upon receipt of the third data, to transmit the third data towards the user entity.

In a further possible implementation form of the first aspect, the MIMO base station is configured to select the further remote transmitter for transmitting the third data if a communication link between the further remote transmitter and the user entity fulfills the third transmission quality requirement.

In a further possible implementation form of the first aspect, the MIMO base station is configured to transmit the first data towards the user entity if a communication link between the MIMO base station and the user entity supports the first quality requirement.

In a further possible implementation form of the first aspect, the first transmission quality requirement is lower than the second transmission quality requirement, and the MIMO base station is configured to transmit the first data to the remote transmitter if a communication link between the base station and the user entity does not fulfills the first transmission quality requirement and if a communication link between the remote transmitter and the user entity fulfills the first transmission quality requirement.

In a further possible implementation form of the first aspect, the respective remote transmitter is arranged in an area of the communication cell which is shaded with respect for transmission beams originating from the MIMO base station.

Thereby, the data stream can efficiently be communicated across the area of the communication cell, in particular in shaded urban regions which are difficult to reach using beamforming.

In a further possible implementation form of the first aspect, the MIMO base station is configured to handle communications in the communication cell using beamforming according the fifth generation (5G) communication technology or higher, and/or the respective broadcast transmitter is configured to broadcast the paging request according to one of the following communication technologies: Global System for Mobile Communications (GSM), Long Term Evolution (LTE), Long Term Evolution Advanced (LTE-A), Universal Mobile Telecommunications Service (UMTS), High Speed Packet Access (HSPA), 3rd Generation Partnership Project (3GPP), in particular 3GPP NR (New Radio), 5G or IEEE radio systems such as Wireless LAN (Local Area Network), WiGig, or any of the evolutions and successors of these technologies.

In a further possible implementation form of the first aspect, the MIMO base station comprises a MIMO antenna, in particular a massive MIMO antenna according to the 5G technology, being configured to receive a communication beam from the user entity and to transmit the communication beam towards the user entity.

In a further possible implementation form of the first aspect, the MIMO antenna comprises an array of antenna elements, in particular at least 16 antenna elements, for generating a code beam, and the base station is configured to generate a feed signal to the MIMO antenna for generating a communication beam upon the basis of a predetermined MIMO codebook, in particular a MIMO codebook according to the 5G technology.

In a further possible implementation form of the first aspect, the respective remote transmitter is configured to broadcast the respective data towards the user entity, or to forward the respective data towards the user entity.

In a further possible implementation form of the first aspect, the respective transmitter comprises at least a beamforming antenna being arranged to transmit or to receive a predetermined beam or a fixed beam.

Each transmitter can comprise circuitry which detects data carried by the received beam, and modulates the received data according to a modulation scheme such as orthogonal frequency-division multiplexing (OFDM), single-carrier frequency division multiplexing (SC-FDM) or quadrature amplitude modulation (QAM), used for broadcasting in one of the aforementioned technologies.

In a further possible implementation form of the first aspect, the respective transmission quality requirement is at least one or a combination of the following requirements: data rate, bite error rate, communication delay, packet error rate, communication bandwidth, quality of service indication, data priority, user service level agreement, in particular user priority.

In a further possible implementation form of the first aspect, the MIMO base station is configured to transmit the respective data towards the respective remote transmitter using a dedicated beam which is spatially directed towards the respective remote transmitter, or the MIMO base station and the respective remote transmitter are connected by a fixed communication network, in particular a glass fiber network.

The dedicated communication beam forms a spatially aligned communication channel towards the respective broadcasting transmitter.

According to a second aspect, the disclosure relates to a user entity, in particular a smartphone or a car communication system, being capable of communicating with the base station system and receiving a data stream from the base station system according to the first aspect, wherein the data stream comprises first data and second data, the first data being associated with a first transmission quality requirement, the second data being associated with a second transmission quality requirement.

The user entity is configured to receive the transmission beam from the MIMO base station, the transmission beam comprising the data, and to receive the second data from the remote transmitter.

In an implementation form, the user entity is configured to compose the received first data and the received second data to a received data stream, which forms a received version of the data stream.

The user entity can be configured to establish a communication channel, in particular a random access control channel, towards the MIMO base station using beamforming before receiving the first data from the MIMO base station.

The user entity can comprise a beamforming antenna, in particular a MIMO antenna arrangement, for transmitting or receiving a communication beam towards the MIMO base station. The beamforming antenna can additionally be configured to receive a broadcast signal. Optionally, the user entity can comprise a broadcast antenna capable of receiving the broadcast signal.

In a further possible implementation form of the second aspect, the user entity is configured to identify at least one broadcast transmitter being associated with the MIMO base station.

According to a third aspect, the disclosure relates to a communication method for transmitting a data stream towards a user entity in a communication network comprising a base station system, wherein the data stream has first data and second data and wherein the base station system comprises: a multiple-in-multiple-out (MIMO) base station configured to handle communications in a communication cell using beamforming and a remote transmitter arranged spaced apart from the MIMO base station in the communication cell.

The communication method comprises the following steps: transmitting the first data towards the user entity using a transmission beam and forwarding the second data towards the remote transmitter by the MIMO base station; upon receipt of the second data, transmitting the second data towards the user entity by the remote transmitter; and receiving the first data from the MIMO base station and the second data from the remote transmitter at the user entity.

The communication method can be implemented using the system according to the first aspect.

Furthermore, the user entity of the second aspect can be configured to communicate with the base station system using the communication method of the third aspect.

Thus, an improved communication method is provided, allowing transmitting a data stream towards a user entity in a more efficient and reliable manner.

According to a fourth aspect, the disclosure relates to a computer program comprising a computer readable program code which, when executed on the MIMO base station and/or the broadcast transmitter of the base station system according to the first aspect, and/or on the user entity according to the second aspect, performs the method according to the third aspect.

According to a fifth aspect, the disclosure relates to a computer program product comprising the computer program according to the fourth aspect.

In the following description, reference is made to the accompanying drawings, which form part of the disclosure, and in which are shown, by way of illustration, specific aspects in which the present invention may be placed. It will be appreciated that other aspects may be utilized and structural or logical changes may be made without departing from the scope of the present invention. The following detailed description, therefore, is not to be taken in a limiting sense, as the scope of the present invention is defined by the appended claims.

For instance, it will be appreciated that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures.

Moreover, in the following detailed description as well as in the claims, embodiments with different functional blocks or processing units are described, which are connected with each other or exchange signals. It will be appreciated that the present invention covers embodiments as well, which include additional functional blocks or processing units that are arranged between the functional blocks or processing units of the embodiments described below.

Finally, it is understood that the features of the various exemplary aspects described herein may be combined with each other, unless specifically noted otherwise.

The present disclosure is based on the recognition that the problems in the state-of-the-art systems can be solved by urban-distributed transmitters, which are arranged spaced apart from and assigned to an actual base station of a cell. More specifically, these urban-distributed transmitters can transmit the data of the associated cell in a decentralized manner to the user entities, such as user equipments or mobile phones or car communication systems, and these distributed transmitters can be thus configured appropriately for this purpose, for instance, by the base station providing the data to be transmitted in real time.

Embodiments of the present disclosure can utilize the massive MIMO resources primarily for data transmissions or communications with high data rates. Also for less resource-demanding communications, embodiments of the present disclosure can utilize spatially-distributed transmitters to handle these communications, such as voice or data with low bit rates or data links with low requirements of quality of service (QoS).

Furthermore, embodiments of the present disclosure can first use beamforming for data transport to the transmitters and then use the transmitters for data transport, especially in shaded urban areas, such as street corners or urban canyons where streets are flanked by high buildings on both sides. In this regard, solid beams spatially directed to the transmitters can be used, which is technically easier to implement by a static adjustment of the antenna parameters.

The system architecture for such a communication system will be further explained under reference to FIGS. 1 and 2 in the following embodiments.

Figure 1:
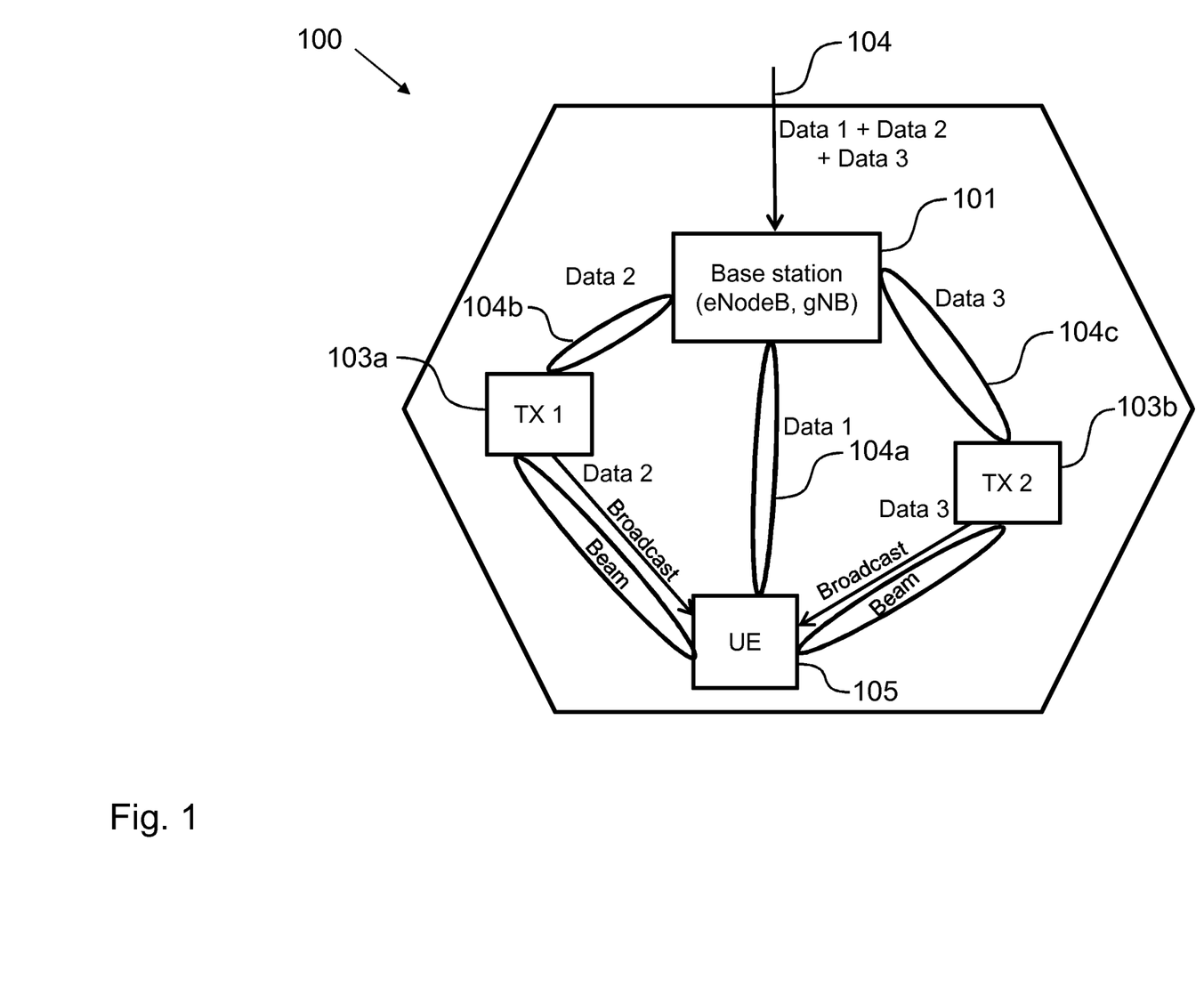
FIG. 1 shows a schematic diagram of a communication network comprising a base station, a remote transmitter, a further remote transmitter and a user entity according to an embodiment.

FIG. 1 shows a schematic diagram of a communication network 100 according to an embodiment, wherein the communication network 100 comprises a multiple-in-multiple-out (MIMO) base station 101, a remote transmitter 103a and a further remote transmitter 103b in a communication cell, as well as a user entity 105 according to an embodiment, wherein the remote transmitter 103a and the further remote transmitter 103b are arranged spaced apart from the MIMO-base station 101 and also apart from each other in the communication cell.

The MIMO base station 101 is configured to handle communications of the user entity 105 in the communication cell using beamforming according the fifth generation (5G) communication technology or even more advanced communication technology. For communicating with the user entity 105, the MIMO base station 101 comprises a MIMO antenna, in particular a massive MIMO antenna according to the 5G technology, which is configured to either receive a communication beam from the user entity 105 or to transmit the communication beam towards the user entity 105, wherein the MIMO antenna can comprise an array of antenna elements, in particular at least 16 antenna elements, for generating a code beam. The base station 101 is configured to generate a feed signal to the MIMO antenna for generating a communication beam upon the basis of a predetermined MIMO codebook, in particular a MIMO codebook according to the 5G technology.

The respective broadcast transmitter 103a-b is configured to broadcast the data or information according to one of the following communication technologies: GSM, LTE, LTE-A, UMTS, HSPA, 3GPP, in particular 3GPP NR, New Radio, 5G or IEEE radio systems such as Wireless LAN, WiGig, or any of the evolutions and successors of these technologies. The respective transmitter 103a-b comprises at least a beamforming antenna arranged to transmit or to receive a predetermined beam or a fixed beam. Furthermore, the MIMO base station 101 is configured to transmit the respective data towards the respective remote transmitter 103a-b using a dedicated beam which is spatially directed towards the respective remote transmitter. Alternatively, the MIMO base station 101 and the respective remote transmitter 103a-b are connected by a fixed communication network, in particular a glass fiber network.

According to an embodiment, the remote transmitter 103a and the further remote transmitter 103b can be controlled by the MIMO base station 101 via a wired connection using copper, coax or fiber.

As for the user entity 105, the user entity 105 may refer to a user equipment that provides a user with voice and/or data connectivity, a handheld device with a radio connection function, or another processing device connected to a radio modem. The user entity 105 may be wireless or mobile user equipment, such as a mobile phone, a vehicle communication system, and a computer with mobile user equipment, for example, may be a portable, pocket-sized, handheld, computer built-in, or in-vehicle mobile apparatus, which exchanges voice and/or data with the radio access network.

Furthermore, the user entity 105 can comprise a beamforming antenna, in particular a MIMO antenna arrangement, for transmitting or receiving a communication beam towards the MIMO base station 101. The beamforming antenna can additionally be configured to receive a broadcast signal. Optionally, the user entity 105 can comprise a broadcast antenna capable of receiving the broadcast signal.

According to an embodiment, the MIMO base station 101 is configured to transmit a data stream 104 to the user entity 105 using beamforming, wherein the data stream 104 comprises first data 104a and second data 104b. First of all, the MIMO base station 101 is configured to directly transmit the first data 104a towards the user entity 101 using a transmission beam, if a communication link between the MIMO base station 101 and the user entity 105 supports a transmission quality requirement for transmitting the first data 104a. The MIMO base station 101 is further configured to forward the second data 104b towards the remote transmitter 103a. Upon receipt of the second data 104b, the remote transmitter 103a is configured to transmit the second data 104b towards the user entity 105.

Alternatively, the MIMO base station 101 can also select the remote transmitter 103a or/and the further remote transmitter 103b to transmit the second data 104b towards the user entity 105, depending on the qualities of their communication links with the user entity 105, and to forward the second data 104b towards the selected remote transmitter(s).

The first data 104a can be, by way of example, associated with a first transmission quality requirement and the second data 104b with a second transmission quality requirement, wherein the first or second transmission quality requirement comprises one or a combination of the following requirements, such as data rate, bite error rate, communication delay, packet error rate, communication bandwidth, quality of service indication, data priority, user service level agreement, in particular user priority. The MIMO base station 101 is then configured to select the remote transmitter 103a if the quality of communication link between the remote transmitter 103a and the user entity 105 supports the second transmission quality requirement.

By way of illustration but not limitation, the first transmission quality requirement can be lower than the second transmission quality requirement according to an embodiment. The MIMO base station 101 is then configured to transmit the first data 104a to the remote transmitter 103a if the communication link between the base station 101 and the user entity 105 does not fulfill the first transmission quality requirement and if the communication link between the remote transmitter 103a and the user entity 105 fulfills the first transmission quality requirement.

According to a further embodiment, the aforementioned data stream 104 can also comprise third data 104c associated with a third transmission quality requirement, wherein the MIMO base station 101 is configured to transmit the third data 104c towards the further remote transmitter 103b if the communication link between the further remote transmitter 103b and the user entity 105 fulfills the third transmission quality requirement, and wherein the further remote transmitter 103b is configured, upon receipt of the third data 104c, to transmit the third data 104c towards the user entity 105.

It is worth noting that the respective remote transmitter 103a-b can either broadcast the respective data towards the user entity 105 or to forward the respective data towards the user entity 105 using beamforming.

According to embodiments of the present disclosure, the remote transmitter 103*a* and the furthermore remote transmitter 103*b* are distributed and spaced apart from the base station 101. To avoid the shadowing effects caused by buildings, trees, or any other obstacles, each respective transmitter 103*a-b* can be further arranged to locate in an area of the communication cell that is shaded with respect for receiving transmission beams originating from the MIMO base station 101.

In this regard, the respective remote transmitter 103*a-b* can determine its location in the communication cell, in particular upon reception of a Global Position System (GPS) signal, and each remote transmitter is configured to transmit, in particular broadcast, its transmitter identification towards the MIMO base station 101.

Figure 2:
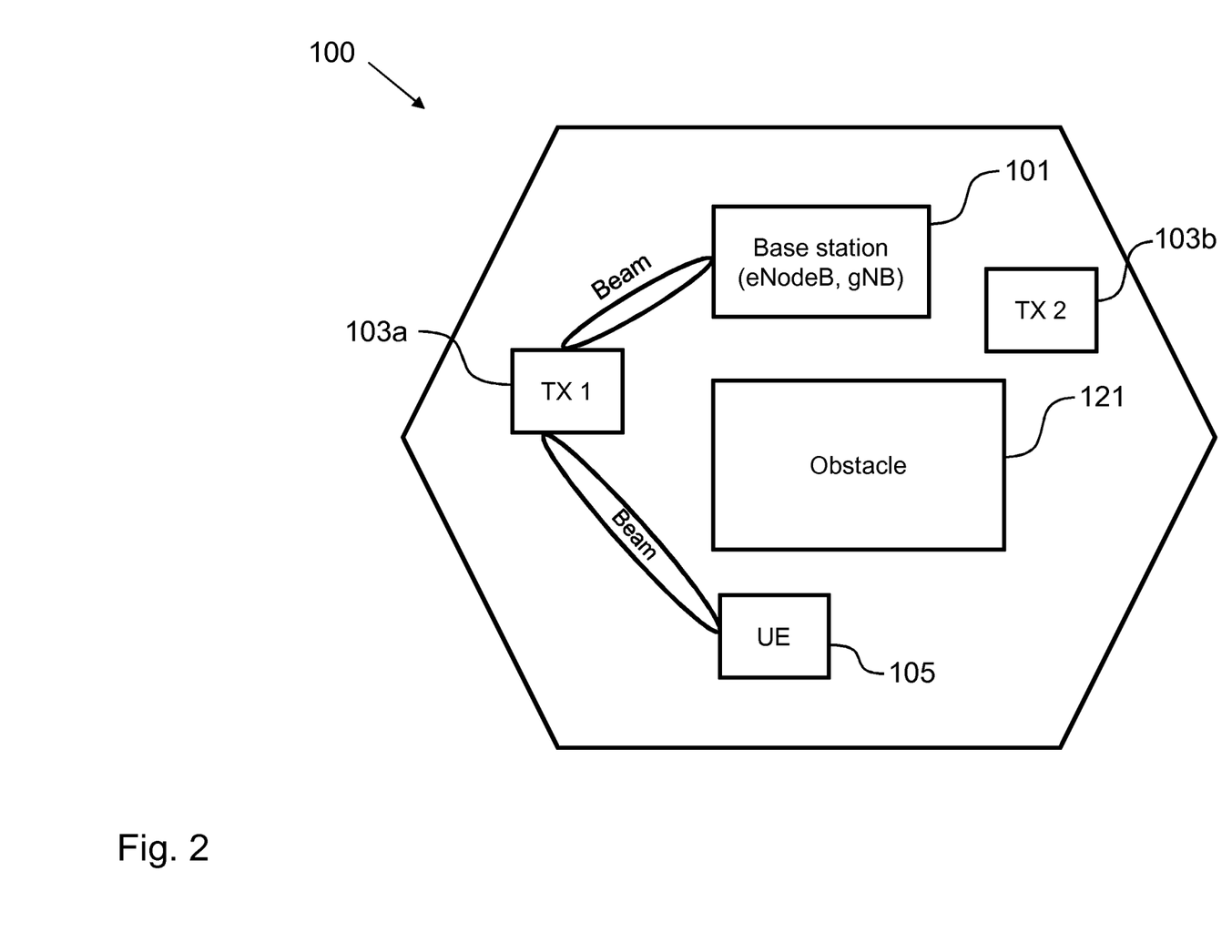
FIG. 2 shows a schematic diagram of a communication network comprising a base station, a remote transmitter, a further remote transmitter and a user entity according to an embodiment.

As illustrated in FIG. 2 in the following, the respective remote transmitter 103*a-b* can transmit its position/location information to the MIMO base station 101, and the MIMO base station 101 can thereby select that transmitter 103*a* having a better connection link to the user entity 105 accordingly, depending on the position of the user entity 105. As a result, the beams can move along with the user entity 105, so that the transmitter 103*a*, which provides better reception to the user entity 105, handles the communication (handover).

Similar to FIG. 1, FIG. 2 shows a schematic diagram of a communication network 100 comprising a multiple-in-multiple-out (MIMO) base station 101, a remote transmitter 103*a* and a further remote transmitter 103*b* in a communication cell according to an embodiment, as well as a user entity 105 according to an embodiment. The remote transmitter 103*a* and the further remote transmitter 103*b* are arranged spaced apart from the MIMO-base station 101 and also apart from each other in the communication cell. An obstacle 121 such as a building or a skyscraper is located between the further remote transmitter 103*b* and the user entity 105 and hinders the communication between the further remote transmitter 103*b* and the user entity 105.

Therefore, the MIMO base station 101 can select the remote transmitter 103*a* which provides a better connection link to the user entity 105 and transmit a data stream 104 to the remote transmitter 103*a*. Upon receipt of the data stream 104, the remote transmitter 103*a* can transmit it to the user entity 105.

According to another embodiment, the MIMO base station 101 can first divide the data stream 104 into first data 104*a* and second data 104*b* as well. Next, the MIMO base station 101 is configured to directly transmit the first data 104*a* towards the user entity 105 using a transmission beam and forward the second data 104*b* towards the remote transmitter 103*a*. Upon receipt of the second data 104*b*, the remote transmitter 103*a* transmits the second data 104*b* towards the user entity 105.

The division of the data can be carried out in the base station 101 according to the following criteria: quality of service (QoS), for instance, data with higher QoS requirements get "additional channels" over the transmitter and data with lower QoS requirements can only be routed via the transmitter; data rate; selection of a communication channel with a lower bit error rate; selection of a transmitter to improve transmission or to "wander" with the user entity; user prioritization; transmission redundancy, especially in safety-critical applications such as announcements or emergency calls.

Furthermore, the MIMO base station 101 knows the signal qualities at the respective transmitter 103*a-b* and can thus select suitable transmitters 103*a-b* for data transmission accordingly. The transmitters 103*a-b* can work preferably in the physical-layer as a repeater. The transmitter nodes 103*a-b* can be connected to the base station 101 via any standardized interface.

In the case of beamforming between the respective transmitter 103*a-b* and the user entity 105, a kind of handover has to be carried out: the user entity 105 and the respective transmitter 103*a-b* have to agree on a communication beam. For instance, the user entity 105 can signal a result of measurements about the transmitting-nodes 103*a-b* to the base station 101; the base station 101, on the basis of this information, can make a decision about operating the data connection via a suitable transmitting node. This process may differ depending on the transmission modes and will be described in detail in the following.

In a mode of time division duplex (TDD), the user entity 105 sends out a beam. The transmitter 103*a-b* which is able to receive the beam directly can generate a beam reversed with respect to the received beam. Then, the transmitter 103*a-b* that can serve the user entity 105, reports to the base station 101 as a transmitter for the user entity 105.

In a mode of frequency division duplex (FDD), the MIMO-transmitters can work with codebooks, so each beam is assigned with an indicator. The user entity 105 can transmit a beam indicator to the transmitter 103*a-b* whose transmission signal was received with a good quality. The transmitter 103*a-b* then sends a message to the base station 101. The base station 101 can select the transmitter to serve the user entity 105, depending on the position of the user entity 105. The selected transmitter can establish a communication to the user entity 105. In this regard, a micro-coverage can thus be provided.

According to the embodiments of the present disclosure, the transmitters 103*a-b* can operate at the physical-layer (PHY) level as pure PHY instances or repeaters. This results in significant advantages in cost reduction for the transmitting nodes. Furthermore, the MIMO capabilities could be limited so that only a fixed defined beam can be set. Such embodiment enables particularly inexpensive transmitter nodes for the connection of stationary system users (i.e. fixed wireless access).

The embodiments of the present disclosure offer in particular the following advantages: firstly, energy can be significantly saved because less transmission power is needed to supply shaded user entities. Secondly, using the "dummy" repeaters for data transmission is cost-effective, which enables mass deployment, especially if the transmitting nodes do not need to support active beamforming.

Furthermore, a micro-coverage of the communication network can be achieved via the distributed transmitters, especially in shaded urban areas; positions of the user entities 105 in a cell can also be detected more precisely. In particular, user prioritization can be achieved by providing a dedicated transmitter at a building, thereby better reception within the building (e.g., additional broadcast).

The installation for fixed wireless access (FWA) can also be realized via the distributed transmitters. Besides, the repeaters for transmitting data can additionally provide WLAN channels, which can make even better use of LTE or 5G resources. Finally, spatial diversity can also be better exploited by the locally-distributed transmitters.

Figure 3:
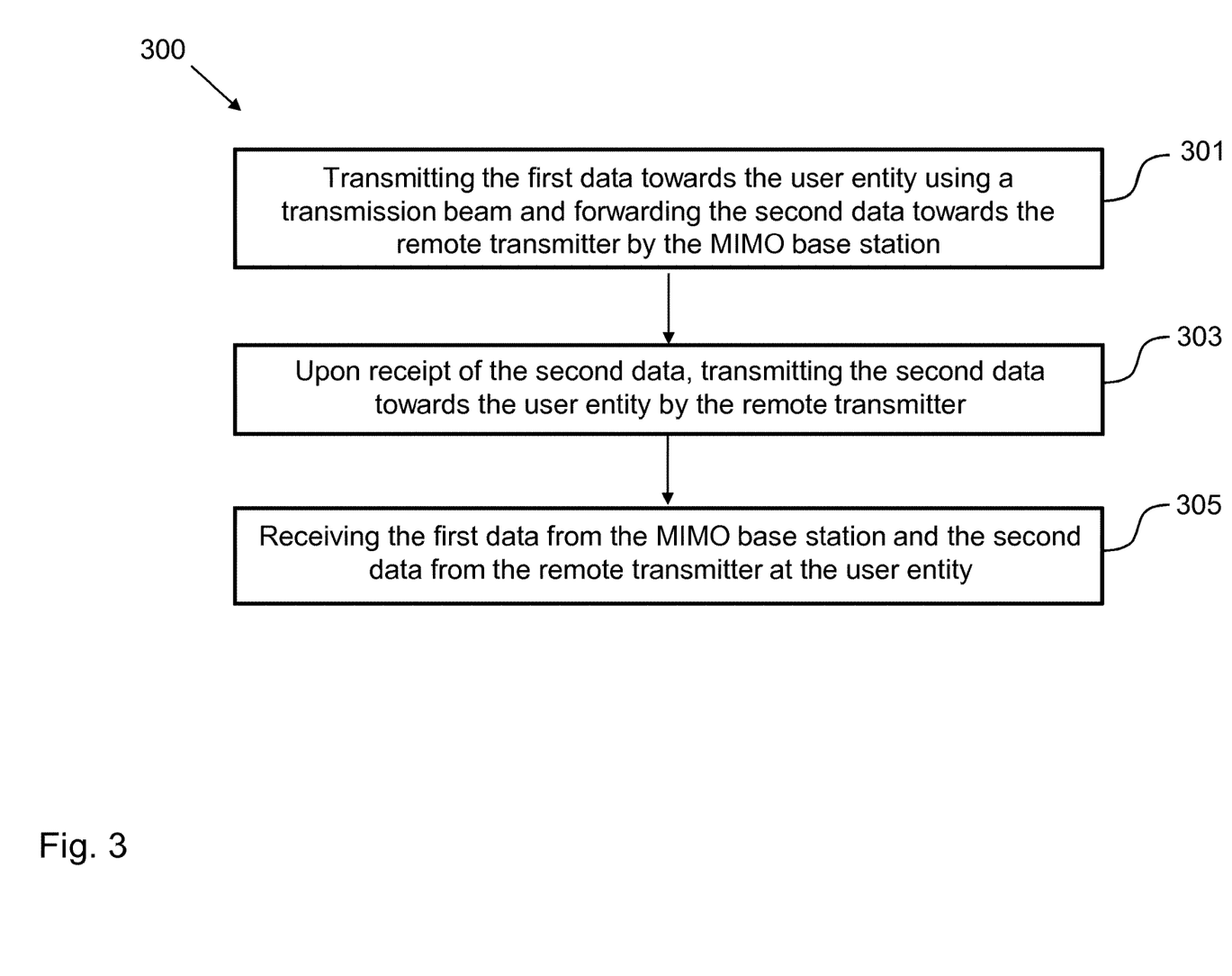
FIG. 3 shows a diagram of a communication method for transmitting a data stream according to an embodiment.

FIG. 3 shows a diagram illustrating a corresponding communication method 300 for transmitting a data stream 104 towards a user entity 105 in a communication network comprising a base station system, wherein the data stream 104 has first data 104a and second data 104b and wherein the base station system comprises: a multiple-in-multiple-out (MIMO) base station 101 configured to handle communications in a communication cell using beamforming and a remote transmitter 103a arranged spaced apart from the MIMO base station 101 in the communication cell.

The communication method 300 comprises the following steps: a first step 301 of transmitting the first data 104a towards the user entity 105 using a transmission beam and forwarding the second data 104b towards the remote transmitter 103a by the MIMO base station 101; upon receipt of the second data 104b, a second step 303 of transmitting the second data 104b towards the user entity 105 by the remote transmitter 103a; and a third step 305 of receiving the first data 104a from the MIMO base station 101 and the second data 104b from the remote transmitter 103a at the user entity 105.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless of whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A base station system for transmitting a data stream towards a user entity, the data stream having first data and second data, the first data being associated with a first transmission quality requirement, the second data being associated with a second transmission quality requirement higher than the first transmission quality requirement, and the base station system comprising:
   a multiple-in-multiple-out (MIMO) base station that is configured to handle communications of the user entity in a communication cell using beamforming;
   a remote transmitter, which is arranged spaced apart from the MIMO base station in the communication cell; and
   a further remote transmitter, which is arranged spaced apart from the MIMO base station and from the remote transmitter in the communication cell, the further remote transmitter being configured to support communications towards the user entity in the communication cell;
   wherein the MIMO base station is configured to:
      directly transmit the first data towards the user entity using a transmission beam based on a communication link between the MIMO base station and the user entity supporting the first transmission quality requirement; or
      transmit the first data to the remote transmitter based on the communication link between the MIMO base station and the user entity not fulfilling the first transmission quality requirement and a communication link between the remote transmitter and the user entity fulfilling the first transmission quality requirement;
   wherein the MIMO base station is further configured to:
      select the remote transmitter or the further remote transmitter for transmitting the second data towards the user entity, wherein the selection is based on whether a quality of communication link between the remote transmitter and the user entity supports the second transmission quality requirement or whether a quality of communication link between the further remote transmitter and the user entity supports the second transmission quality requirement; and forward the second data towards the selected remote transmitter; and wherein the remote transmitter and the further remote transmitter are configured to broadcast data to the user entity without beamforming.

2. The base station system according to claim 1, wherein the MIMO base station is further configured to select the further remote transmitter for transmitting third data of the data stream, the third data being associated with a third transmission quality requirement, based on a communication link between the further remote transmitter and the user entity fulfilling the third transmission quality requirement.

3. The base station system according to claim 1, wherein the MIMO base station comprises a MIMO antenna configured to receive a communication beam from the user entity and to transmit the communication beam towards the user entity.

4. The base station system according to claim 1, wherein the first transmission quality requirement and the second transmission quality requirement each comprises at least one of the following types of requirements: data rate, bite error rate, communication delay, packet error rate, communication bandwidth, quality of service indication, data priority, or user service level agreement.

5. The base station system according to claim 1, wherein the MIMO base station is configured to transmit the second data towards the selected remote transmitter using a dedicated beam which is spatially directed towards the selected remote transmitter, or wherein the MIMO base station and the selected remote transmitter are connected by a fixed communication network.

6. A communication system, comprising:
the base station system according to claim 1; and
the user entity, wherein the user entity is configured to communicate with and receive the data stream from the base station system;
wherein the user entity is further configured to:
receive the first data from the MIMO base station via the transmission beam or receive the first data from the remote transmitter; and
receive the second data from the selected transmitter.

7. The communication system of claim 6, wherein the user entity is configured to identify at least one broadcast transmitter associated with the MIMO base station.

8. A communication method for transmitting a data stream towards a user entity in a communication network, the data stream having first data and second data, the first data being associated with a first transmission quality requirement, the second data being associated with a second transmission quality requirement higher than the first transmission quality requirement, and the communication method comprising:
transmitting, by a base station system of the communication network, the first data of the data stream to the user entity, wherein transmitting the first data to the user entity comprises:
directly transmitting the first data towards the user entity using a transmission beam based on a communication link between a multiple-in-multiple-out (MIMO) base station of the base station system and the user entity supporting the first transmission quality requirement; or
transmitting the first data to a remote transmitter of the base station system based on the communication link between the MIMO base station and the user entity not fulfilling the first transmission quality requirement and a communication link between the remote transmitter and the user entity fulfilling the first transmission quality requirement;
selecting, by the MIMO base station, the remote transmitter or a further remote transmitter of the base station system for transmitting the second data of the data stream towards the user entity, wherein the selection is based on whether a quality of communication link between the remote transmitter and the user entity supports the second transmission quality requirement or whether a quality of communication link between the further remote transmitter and the user entity supports the second transmission quality requirement;
forwarding, by the MIMO base station, the second data towards the selected remote transmitter; and
broadcasting, by the selected remote transmitter, the second data to the user entity without beamforming.

9. One or more non-transitory computer-readable mediums having processor-executable instructions stored thereon for transmitting a data stream towards a user entity in a communication network, the data stream having first data and second data, the first data being associated with a first transmission quality requirement, the second data being associated with a second transmission quality requirement higher than the first transmission quality requirement, and the processor-executable instructions, when executed, facilitating:
transmitting, by a base station system of the communication network, the first data of the data stream to the user entity, wherein transmitting the first data to the user entity comprises:
directly transmitting the first data towards the user entity using a transmission beam based on a communication link between a multiple-in-multiple-out (MIMO) base station of the base station system and the user entity supporting the first transmission quality requirement; or
transmitting the first data to a remote transmitter of the base station system based on the communication link between the MIMO base station and the user entity not fulfilling the first transmission quality requirement and a communication link between the remote transmitter and the user entity fulfilling the first transmission quality requirement;
selecting, by the MIMO base station, the remote transmitter or a further remote transmitter of the base station system for transmitting the second data of the data stream towards the user entity, wherein the selection is based on whether a quality of communication link between the remote transmitter and the user entity supports the second transmission quality requirement or whether a quality of communication link between the further remote transmitter and the user entity supports the second transmission quality requirement;
forwarding, by the MIMO base station, the second data towards the selected remote transmitter; and
broadcasting, by the selected remote transmitter, the second data to the user entity without beamforming.

* * * * *